United States Patent
Kawabe

(10) Patent No.: US 12,288,915 B2
(45) Date of Patent: Apr. 29, 2025

(54) FUEL BATTERY STACK

(71) Applicant: TOYOTA BOSHOKU KABUSHIKI KAISHA, Aichi-ken (JP)

(72) Inventor: Satoshi Kawabe, Ichinomiya (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 744 days.

(21) Appl. No.: 17/636,306

(22) PCT Filed: Nov. 27, 2020

(86) PCT No.: PCT/JP2020/044281
§ 371 (c)(1),
(2) Date: Feb. 17, 2022

(87) PCT Pub. No.: WO2021/124836
PCT Pub. Date: Jun. 24, 2021

(65) Prior Publication Data
US 2022/0285719 A1  Sep. 8, 2022

(30) Foreign Application Priority Data
Dec. 16, 2019 (JP) .................................. 2019-226250

(51) Int. Cl.
*H01M 8/2483* (2016.01)

(52) U.S. Cl.
CPC ...... *H01M 8/2483* (2016.02); *H01M 2250/20* (2013.01)

(58) Field of Classification Search
CPC .......................... H01M 8/2483; H01M 2250/20
See application file for complete search history.

(56) References Cited

U.S. PATENT DOCUMENTS

2018/0034091 A1* 2/2018 Shimizu ............... H01M 8/241

FOREIGN PATENT DOCUMENTS

JP   2006-49129   2/2006

OTHER PUBLICATIONS

International Search Report in International Application No. PCT/JP2020/044281, filed Jan. 19, 2021, along with an English translation thereof.

* cited by examiner

*Primary Examiner* — Sarah A. Slifka
(74) *Attorney, Agent, or Firm* — Greenblum & Bernstein, P.L.C.

(57) ABSTRACT

A fuel cell stack includes a cell stack body, a terminal plate, an end plate, and a passage portion. The terminal plate is disposed to be adjacent to the cell stack body in a stacking direction and is configured to collect power. The end plate is disposed on a side of the terminal plate that is opposite to the cell stack body. The terminal plate and the end plate have a through-hole that discharges reactant gas from the cell stack body. The passage portion covers an inner peripheral surface of the through-hole. The passage portion includes a peripheral wall that is formed of a plastic having an electrical insulation property and a hydrophilic portion disposed on an inner peripheral surface of the peripheral wall and is made of a plastic having a hydrophilicity higher than that of the plastic forming the peripheral wall.

5 Claims, 2 Drawing Sheets

FUEL BATTERY STACK

TECHNICAL FIELD

The present disclosure relates to a fuel cell stack.

BACKGROUND ART

A fuel cell includes a fuel cell stack, which includes a cell stack body having multiple single cells stacked together (for example, refer to Patent Document 1). The fuel cell stack disclosed in Patent Document 1 includes an end plate at each of the opposite ends in the stacking direction of the cell stack body with a terminal plate and an insulating plate in between. Each set of the terminal plate, the insulating plate, and the end plate has fuel-gas-discharging continuous holes for discharging fuel gas and oxidant-gas-discharging continuous holes for discharging oxidant gas. An insulating grommet is disposed on the inner peripheral surface of each gas-discharging continuous hole to extend through all of the terminal plate, the insulating plate, and the end plate.

This type of fuel cell stack generates water when generating power (hereinafter, such water will be referred to as generated water). During power generation, generated water is discharged to the outside through the insulating grommet together with off-gas of fuel gas and oxidant gas. Hereinafter, fuel gas and oxidant gas will collectively be referred to as reactant gas.

PRIOR ART DOCUMENT

Patent Document

Patent Document 1: Japanese Laid-Open Patent Publication No. 2006-49129

SUMMARY OF THE INVENTION

Problems that the Invention is to Solve

In this type of fuel cell stack, generated water remains in the cell stack body after power generation is stopped. The generated water remaining in the cell stack body moves toward the outside under its own weight or due to the pressure difference between inside and outside of the cell stack body. The generated water thus gradually reaches the vicinity of the insulating grommet. In this situation, if the outside air temperature drops below zero, the generated water in the vicinity of the insulating grommet can freeze and block the discharge passage for reactant gas.

Accordingly, it is an objective of the present disclosure to provide a fuel cell stack that improves water discharging performance.

Means for Solving the Problems

To achieve the foregoing objective, a fuel cell stack is provided that includes a cell stack body including single cells stacked together, a terminal plate that is disposed to be adjacent to the cell stack body in a stacking direction and is configured to collect power, and an end plate disposed on a side of the terminal plate that is opposite to the cell stack body. The terminal plate and the end plate have a through-hole that discharges reactant gas from the cell stack body. The fuel cell stack further comprises a passage portion that covers an inner peripheral surface of the through-hole and forms a discharge passage for the reactant gas. The passage portion includes a peripheral wall that is formed of a plastic having an electrical insulation property, and a hydrophilic portion disposed on an inner peripheral surface of the peripheral wall and made of a plastic having a hydrophilicity higher than that of the plastic forming the peripheral wall.

With this configuration, the hydrophilic portion is disposed on the inner peripheral surface of the peripheral wall of the passage portion. Thus, the contact angle between a droplet of generated water on the inner peripheral surface of the hydrophilic portion and the inner peripheral surface is smaller than the contact angle of a droplet of generated water on the inner peripheral surface of a peripheral wall that does not have a hydrophilic portion. That is, the contact area between the droplet of generated water and the inner peripheral surface of the passage portion is larger than that in a peripheral wall that does not have a hydrophilic portion. This reduces the distance between droplets of generated water that are close to each other, allowing droplets of generated water in the passage portion to aggregate easily. As a result, masses of generated water, which have increased in size due to droplets aggregating, become susceptible to the effects of their own weight and the pressure difference between inside and outside of the cell stack body. The generated water is thus easily discharged to the outside from the passage portion. This improves the water discharging performance for generated water.

MODES FOR CARRYING OUT THE INVENTION

One embodiment will now be described with reference to FIGS. 1 and 2.

Figure 1:
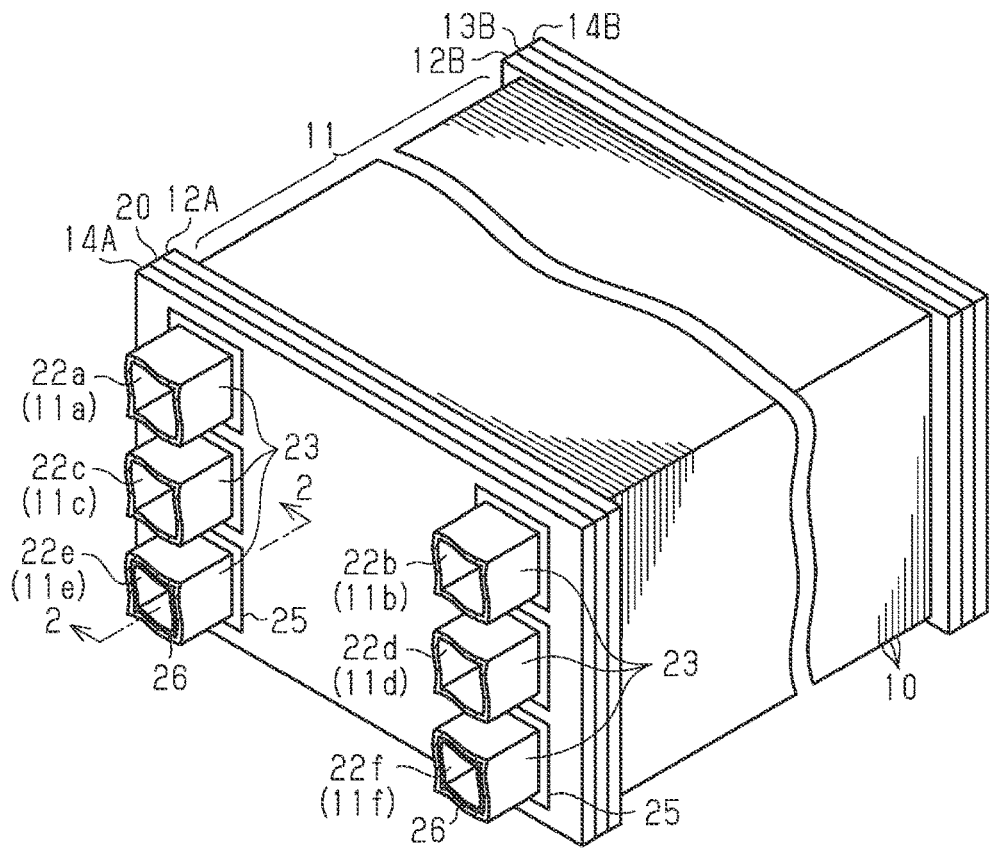
FIG. 1 is a perspective view showing a fuel cell stack according to one embodiment.
Figure 2:
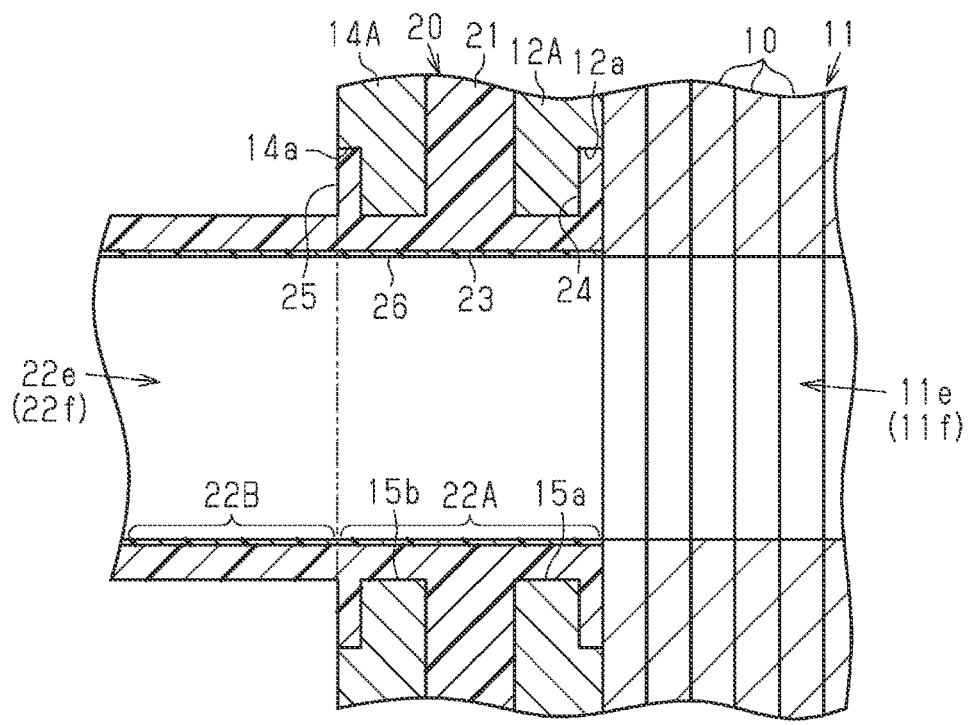
FIG. 2 is a cross-sectional view taken along line 2-2 of FIG. 1.

As shown in FIGS. 1 and 2, a fuel cell stack includes a cell stack body 11, which is formed by stacking plate-shaped single cells 10 in the thickness direction.

An end plate 14A is arranged at one end in the stacking direction of the cell stack body 11 with a terminal plate 12A and an insulating plate 20 in between. The terminal plate 12A collects power, and the insulating plate 20 performs insulation. An end plate 14B is arranged at the other end in the stacking direction of the cell stack body 11 with a terminal plate 12B and an insulating plate 13B in between. The terminal plate 12B collects power, and the insulating plate 13B performs insulation. In the following description, the stacking direction of the cell stack body 11 will simply be referred to as the stacking direction.

As shown in FIG. 1, the cell stack body 11 has three passages 11a, 11b, and 11c that respectively supply cathode gas (for example, oxygen gas in the air), anode gas (for example, hydrogen gas), and a cooling medium (for example, cooling water) to each single cell 10. The cell stack body 11 has another three passages 11f, 11e and 11d that respectively discharge the cathode gas, the anode gas, and the cooling medium, which have been used to generate power in each single cell 10.

As shown in FIG. 2, the terminal plate 12A has six through-holes 15a, each through-hole 15a having a rectangular shape and extending through the terminal plate 12A in the thickness direction. The through-holes 15a respectively circulate cathode gas, anode gas, and a cooling medium to and from the passages 11a to 11f of the cell stack body 11. Hereinafter, cathode gas and anode gas will be collectively referred to as reactant gas.

The end plate 14A has six through-holes 15b, each through-hole 15b extending through the end plate 14A in the thickness direction. The six through-holes 15b are located at positions corresponding to the through-holes 15a. The through-holes 15b allow reactant gas and a cooling medium to flow therethrough. The through-holes 15b have the same rectangular shape as the through-holes 15a.

The terminal plate 12B and the end plate 14B do not have the through-holes 15a, 15b.

The configuration of the insulating plate 20 will now be described. In the following description, the side of each of the plates 12A, 20, and 14A that is closer to the cell stack body 11 will be referred to as an inner side, and the side away from the cell stack body 11 will be referred to as an outer side.

As shown in FIGS. 1 and 2, the insulating plate 20 includes a plate body 21, which is disposed between the terminal plate 12A and the end plate 14A, and six passage portions 22a to 22f, which cover the inner peripheral surfaces of the through-holes 15a, 15b and allow the reactant gas and cooling medium to flow therethrough.

In the present embodiment, cathode gas is supplied to each single cell 10 through the passage portion 22a and the passage 11a, and discharged through the passage 11f and the passage portion 22f. Anode gas is supplied to each single cell 10 through the passage portion 22b and the passage 11b, and discharged through the passage 11e and the passage portion 22e. Cooling medium is supplied to each single cell 10 through the passage portion 22c and the passage 11c, and discharged through the passage 11d and the passage portion 22d.

As shown in FIG. 1, the passage portions 22a to 22f each include a peripheral wall 23. The peripheral wall 23 has a rectangular annular cross-sectional shape. The peripheral walls 23 and the plate body 21 are integrally formed of a plastic having an electrical insulation property. The plastic having an electrical insulation property is preferably polyphenylene sulfide, polyamide, polypropylene, or polyethylene.

In the following description, a section of each of the passage portions 22a to 22f that is on the inner side of the outer surface of the end plate 14A will be referred to as an inner passage portion 22A. Also, a section of each of the passage portions 22a to 22f that is on the outer side of the outer surface of the end plate 14A will be referred to as an outer passage portion 22B.

The inner peripheral surface of the inner passage portion 22A is flush with the inner peripheral surface of the outer passage portion 22B.

Each inner passage portion 22A includes an inner flange 24 and an outer flange 25 at the opposite ends in the axial direction of the peripheral wall 23. The inner flange 24 and the outer flange 25 protrude toward the outer periphery. The inner flange 24 is accommodated in a recess 12a of the terminal plate 12A. The inner surface of the inner flange 24 is flush with the inner surface of the terminal plate 12A. The outer flange 25 is accommodated in a recess 14a of the end plate. The outer surface of the outer flange 25 is flush with the outer surface of the end plate 14A.

Among the passage portions 22a to 22f, the passage portions 22e, 22f discharge the reactant gas that has been used to generate power in each single cell 10. The inner peripheral surface of the peripheral wall 23 of each of the passage portions 22e, 22f is entirely covered with a hydrophilic portion 26. The hydrophilic portions 26 are made of a plastic having a hydrophilicity higher than that of the plastic forming the peripheral walls 23. Each hydrophilic portion 26 is disposed in both of the inner passage portion 22A and the outer passage portion 22B. The hydrophilic plastic is preferably, for example, a polyolefin-based plastic.

As shown in FIG. 2, the inner peripheral surface of the inner passage portion 22A in each of the passage portions 22e, 22f, that is, the inner peripheral surface of the hydrophilic portion 26 is flush with the inner peripheral surface of each of the passages 11e, 11f of the cell stack body 11.

The hydrophilic portion 26 is not disposed on the inner peripheral surfaces of the peripheral walls 23 of the passage portions 22a, 22b, which supply reactant gas to each single cell 10, the passage portion 22c, which supplies a cooling medium to each single cell 10, or the passage portion 22d, which discharges a cooling medium from each single cell 10.

A method of molding the insulating plate 20 will now be described.

The insulating plate 20 is formed by performing insert molding in which the terminal plate 12A and the end plate 14A are inserted into a molding die, and molten plastic is injected into a cavity defined by the molding die and the plates 12A, 14A. This molds the insulating plate 20 integrally with the terminal plate 12A and the end plate 14A.

The hydrophilic portions 26 are formed by performing two-color molding in which the integrally molded component including the insulating plate 20, the terminal plate 12A, and the end plate 14A, is inserted into a molding die, and molten plastic is injected into a cavity defined between the molding die and the corresponding peripheral walls 23. This molds the hydrophilic portions 26 integrally with the peripheral walls 23.

An operation of the present embodiment will now be described.

The hydrophilic portions 26 are disposed on the inner peripheral surfaces of the peripheral walls 23 of the inner passage portions 22A. Thus, the contact angle between a droplet of generated water on the inner peripheral surface of each hydrophilic portion 26 and the inner peripheral surface is smaller than the contact angle of a droplet of generated water on the inner peripheral surface of a peripheral wall that does not have a hydrophilic portion 26. That is, the contact area between the droplet of generated water and the inner peripheral surface of the inner passage portion 22A is larger than that in a peripheral wall that does not have a hydrophilic portion 26. This reduces the distance between droplets of generated water that are close to each other, allowing droplets of generated water in the inner passage portion 22A to aggregate easily. As a result, masses of generated water, which have increased in size due to droplets aggregating, become susceptible to the effects of their own weight and the pressure difference between the inside and outside of the cell stack body 11. The generated water is thus easily discharged to the outside from the inner passage portion 22A.

The present embodiment has the following advantages.

(1) The fuel cell stack includes the cell stack body 11, the terminal plate 12A, and the end plate 14A. The terminal plate 12A and the end plate 14A have the through-holes 15a, 15b, which discharge reactant gas from the cell stack body 11. The fuel cell stack includes the inner passage portions 22A, which cover the inner peripheral surfaces of the through-holes 15a, 15b, and form discharge passages for reactant gas. The inner passage portions 22A each include the peripheral wall 23 and the hydrophilic portion 26. The peripheral walls 23 are formed of a plastic having an electrical insulation property. Each hydrophilic portion 26 is disposed on the inner peripheral surface of the corresponding peripheral wall 23 and is made of a plastic having a hydrophilicity higher than that of the plastic forming the peripheral wall 23.

This configuration operates in the above-described manner and thus improves the water discharging performance for generated water.

(2) The fuel cell stack includes the outer passage portions 22B, which are connected to the inner passage portions 22A and extend outward from the end plate 14A. The inner peripheral surface of each inner passage portion 22A and the inner peripheral surface of the corresponding outer passage portion 22B are flush with each other.

This configuration does not create a step between the inner peripheral surface of the outer passage portion 22B and the inner peripheral surface of the inner passage portion 22A, preventing generated water from being retained in the inner passage portion 22A. Therefore, generated water is smoothly discharged to the outside.

(3) The outer passage portions 22B each include the peripheral wall 23 and the hydrophilic portion 26. Each outer passage portion 22B is molded integrally with the corresponding inner passage portion 22A.

This configuration allows the inner peripheral surface of each inner passage portion 22A and the inner peripheral surface of the corresponding outer passage portion 22B to be flush with each other easily. Also, as compared to a case in which the outer passage portion 22B is formed separately from the inner passage portion 22A and connected to the inner passage portion 22A, the number of components and the number of manufacturing steps of the fuel cell stack are reduced.

<Modifications>

The above-described embodiment may be modified as follows. The present embodiment and the following modifications can be combined as long as the combined modifications remain technically consistent with each other.

Each hydrophilic portion 26 may be disposed only on a part of the inner peripheral surface of the corresponding peripheral wall 23. In this case, the hydrophilic portions 26 are preferably disposed in sections that are located in lower parts of the passage portions 22e, 22f when the fuel cell stack is positioned to be mounted on a vehicle.

The inner peripheral surface of each outer passage portion 22B and the inner peripheral surface of the corresponding inner passage portion 22A do not necessarily need to be flush with each other. That is, the inner peripheral surface of the outer passage portion 22B and the inner peripheral surface of the inner passage portion 22A may be connected to each other with a step in between.

Figure 3:
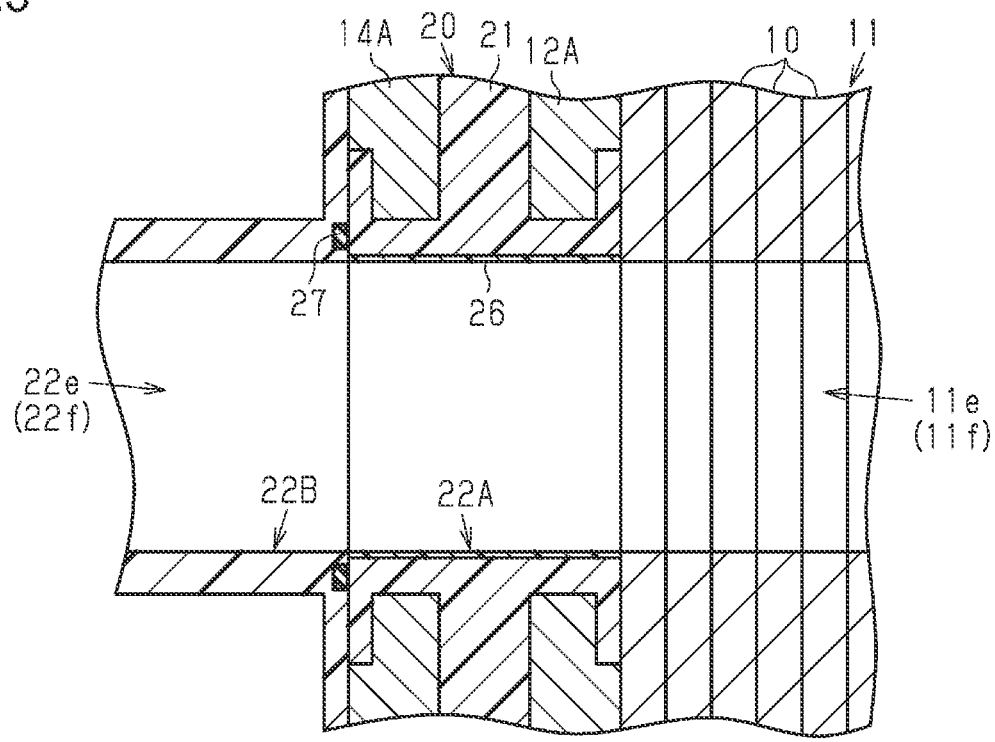
FIG. 3 is a cross-sectional view showing a fuel cell stack according to a modification.

As shown in FIG. 3, an outer passage portion 22B that is formed separately from the inner passage portion 22A may be connected to the inner passage portion 22A with a seal member 27 in between. In this case, the inner peripheral surface of the hydrophilic portion 26 of the inner passage portion 22A and the inner peripheral surface of the outer passage portion 22B are preferably flush with each other.

Figure 4:
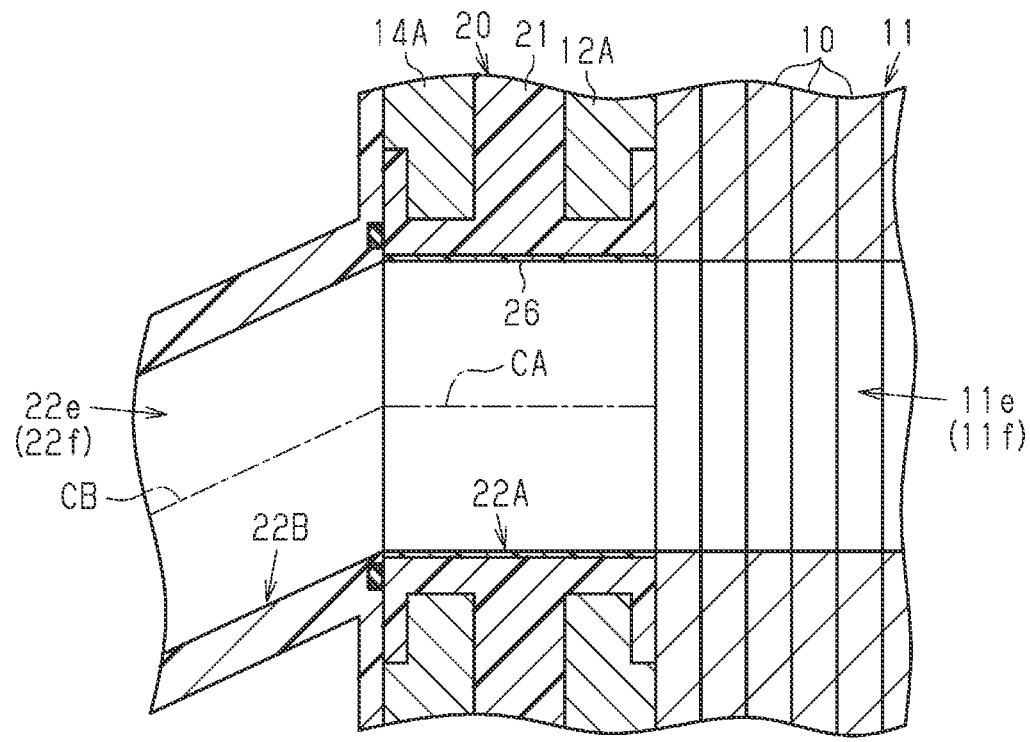
FIG. 4 is a cross-sectional view showing a fuel cell stack according to another modification.

As shown in FIG. 4, a central axis CB of the outer passage portion 22B may be inclined with respect to the central axis CA of the inner passage portion 22A.

This configuration allows the outer passage portion 22B to be arranged to decline as the distance from the end plate 14A increases even if the fuel cell stack is positioned to be mounted on a vehicle on a horizontal road surface with the central axis CA of the inner passage portion 22A extending along the road surface. Thus, the generated water that has moved to the outer passage portion 22B is discharged effectively by the effect of its own weight.

The cross-sectional shape of each peripheral wall 23 is not limited to a rectangular annular shape. That is, each peripheral wall 23 may have any cross-sectional shape as long as it is annular. In this case, the term "annular" refers to any structure that forms a loop, which is a continuous shape with no ends. "Annular" shapes include but are not limited to a circular shape, an elliptic shape, and a polygonal shape with sharp or rounded corners.

DESCRIPTION OF THE REFERENCE NUMERALS

10 . . . Single Cells
11 . . . Cell Stack Body
11a-11f . . . Passages
12A, 12B . . . Terminal Plates
12a . . . Recess
13B, 20 . . . Insulating Plates
14A, 14B . . . End Plates
14a . . . Recess
15a, 15b . . . Through Holes
21 . . . Plate Body
22a-22f . . . Passage Portions
22A . . . Inner Passage Portion
22B . . . Outer Passage Portion
23 . . . Peripheral Walls
24 . . . Inner Flange
25 . . . Outer Flange
26 . . . Hydrophilic Portions
27 . . . Seal Member

The invention claimed is:

1. A fuel cell stack, comprising:
a cell stack body including single cells stacked together;
a terminal plate that is disposed to be adjacent to the cell stack body in a stacking direction and is configured to collect power; and
an end plate disposed on a side of the terminal plate that is opposite to the cell stack body, wherein
the terminal plate and the end plate have a through-hole that discharges reactant gas from the cell stack body,
the fuel cell stack further comprises a passage portion that covers an inner peripheral surface of the through-hole and forms a discharge passage for the reactant gas, and
the passage portion includes:
    a peripheral wall that is formed of a plastic having an electrical insulation property; and
    a hydrophilic portion disposed on an inner peripheral surface of the peripheral wall and made of a plastic having a hydrophilicity higher than that of the plastic forming the peripheral wall.

2. The fuel cell stack according to claim 1, wherein
the passage portion is an inner passage portion,
the fuel cell stack further comprises an outer passage portion that is connected to the inner passage portion and extends outward from the end plate, and
an inner peripheral surface of the inner passage portion and an inner peripheral surface of the outer passage portion are flush with each other.

3. The fuel cell stack according to claim 2, wherein the outer passage portion includes the peripheral wall and the hydrophilic portion and is molded integrally with the inner passage portion.

4. The fuel cell stack according to claim 2, wherein a central axis of the outer passage portion is inclined with respect to a central axis of the inner passage portion.

5. The fuel cell stack according to claim 1, further comprising an insulating plate that is disposed between the end plate and the terminal plate and is formed of a plastic having an electrical insulation property, wherein the insulating plate is molded integrally with the peripheral wall of the passage portion.

* * * * *